(12) United States Patent
Pamatmat

(10) Patent No.: US 9,687,917 B2
(45) Date of Patent: Jun. 27, 2017

(54) QUICK RELEASE ROTARY TOOL MANDREL

(71) Applicant: Timothy Carl Pamatmat, Forestville, CA (US)

(72) Inventor: Timothy Carl Pamatmat, Forestville, CA (US)

( * ) Notice: Subject to any disclaimer, the term of this patent is extended or adjusted under 35 U.S.C. 154(b) by 561 days.

(21) Appl. No.: 14/070,236

(22) Filed: Nov. 1, 2013

(65) Prior Publication Data
US 2014/0126973 A1 May 8, 2014

Related U.S. Application Data

(60) Provisional application No. 61/796,251, filed on Nov. 4, 2012.

(51) Int. Cl.
*B23B 51/12* (2006.01)
*B23B 51/04* (2006.01)

(52) U.S. Cl.
CPC ...... *B23B 51/0473* (2013.01); *B23B 2240/04* (2013.01); *B23B 2251/02* (2013.01); *B23B 2260/136* (2013.01); *Y10T 408/953* (2015.01)

(58) Field of Classification Search
CPC ............ B23B 51/0473; B23B 2240/04; B23B 2251/02; B23B 2260/136
USPC .................... 279/2.02, 2.03, 2.04, 2.14, 2.16
See application file for complete search history.

(56) References Cited

U.S. PATENT DOCUMENTS

| 767,261 | A | * | 8/1904 | Byer | ..................... B23B 31/103 279/103 |
| 1,312,298 | A | * | 8/1919 | Bileck | ................... B23B 31/103 279/77 |
| 2,480,595 | A | * | 8/1949 | Moyer | ................ B23B 51/0473 279/83 |
| 6,705,807 | B1 | * | 3/2004 | Rudolph | ............. B23B 51/0426 279/143 |
| 2007/0160434 | A1 | * | 7/2007 | Gillissen | ............. B23B 51/0426 408/68 |

* cited by examiner

*Primary Examiner* — Sunil K Singh
*Assistant Examiner* — Alan Snyder
(74) *Attorney, Agent, or Firm* — Howard Cohen

(57) ABSTRACT

A quick connect/disconnect mechanism for a rotary bit having a central mounting hole at a proximal end includes a shaft extending axially and having a proximal end adapted to be releasably secured in a rotary tool and a distal end having a spud extending distally and axially therefrom. A collet has a plurality of retainer arms arrayed circularly about the axis and extending distally, each retainer arm including a catch extending radially outwardly from a distal end thereof. A support ring extends about the shaft adjacent to said distal end thereof, the support ring being translatable from a first position in which the retainer arms extend freely distally and are deflectable sufficiently to be inserted through the central mounting hole of a rotary bit; to a second position in which the support ring and collet translate proximally and the spud extends distally to engage the retainer arms so they cannot deflect and release the rotary bit.

7 Claims, 18 Drawing Sheets

QUICK RELEASE ROTARY TOOL MANDREL

CROSS-REFERENCE TO RELATED APPLICATIONS

This application claims the benefit of the filing date priority of U.S. Provisional Patent Application No. 61/796,251, filed on Nov. 4, 2012, entitled "Hole Saw Mandrel Assembly".

FEDERALLY SPONSORED RESEARCH

Not applicable.

SEQUENCE LISTING, ETC ON CD

Not applicable.

BACKGROUND OF THE INVENTION

Field of the Invention

This invention relates to holesaws and, more particularly to a mandrel assembly for supporting holesaws in a quick connect/disconnect manner.

Description of Related Art

There are a variety of hole saw mandrel designs disclosing various quick release mechanism that exist in the art. These designs allow the user to "swap out" hole saw bits in a fraction of the time it would take with a traditional mandrel. However, the problem with these designs is they all require the user to attach some form of a external quick disconnect member to every one of their hole saw bits. There are many disadvantages to this approach, the primary one being the quick release members have been attached to the user's bits they will no longer fit in the case they came with. In addition, the extra cost associated with these male connectors and the time required to attach them is a disadvantage. Finally, one of the primary reasons the user removes the saw bit is to remove the wooden plug, unfortunately the attached quick release members substantially obscures the hole typically used to push out and eject the plug. Therefore, there is a need shown in the prior art for a quick release mandrel that does not require the user to mount an external quick release member to their existing saw bits, and which enables ejection of the cutout plug from the bit.

BRIEF SUMMARY OF THE INVENTION

Accordingly, the present invention addresses this situation by providing a hole saw mandrel with integrated quick connect/disconnect saw bit retention means that does not require the use of a external quick release members.

Other advantages of the present invention will become apparent to those skilled in this art from the following description and drawings wherein there is described and shown a preferred embodiment of this invention in one of the best modes contemplated for carrying out the invention. As will be realized, the invention is capable of other modification in various, obvious aspects all without departing from the invention. Accordingly, the drawings and descriptions will be regarded as illustrative in nature and not as restrictive.

Other novel features characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

DETAILED DESCRIPTION OF THE INVENTION

Figure 1:
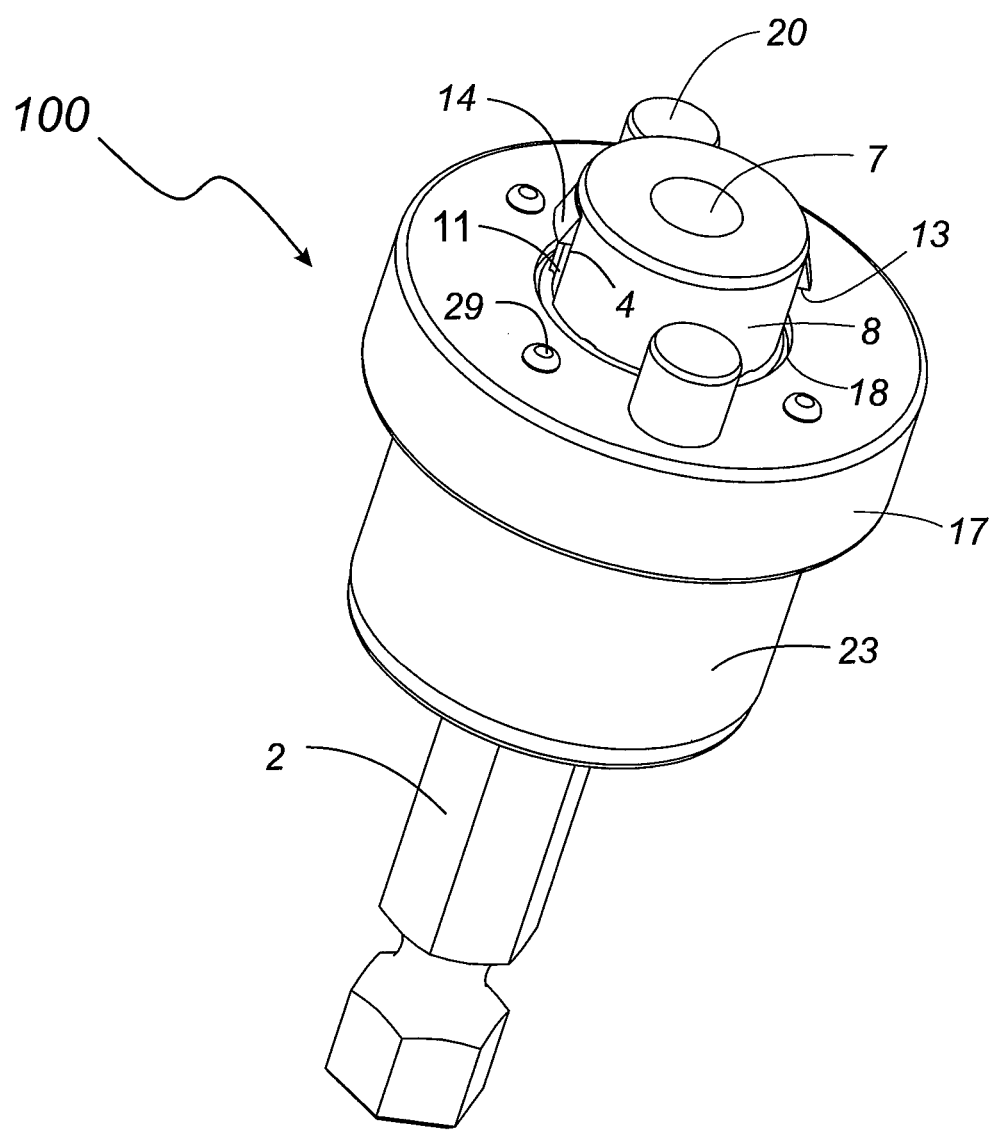
FIG. 1 is a perspective view of embodiment 100 of the present invention.
Figure 2:
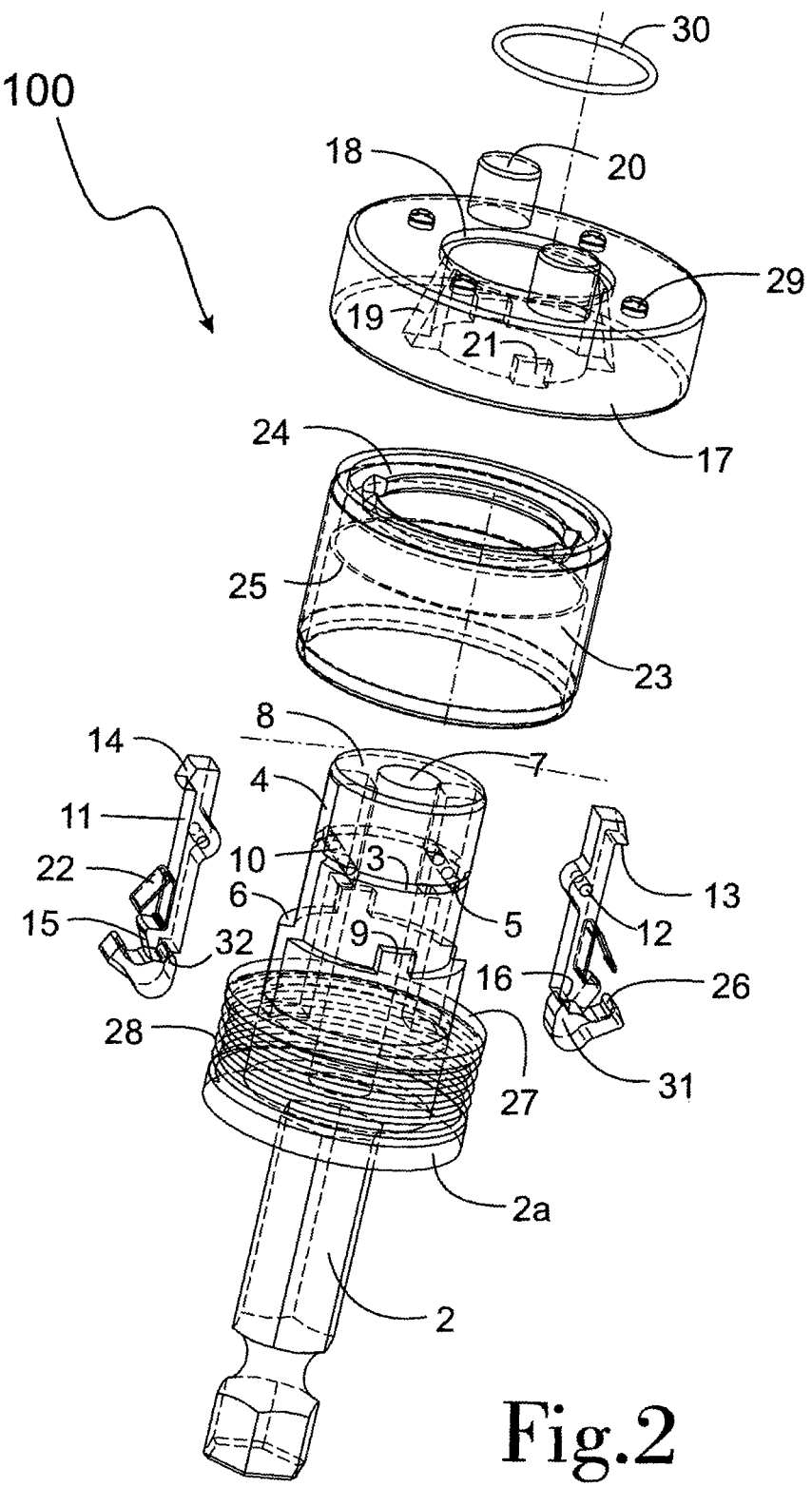
FIG. 2 is a exploded perspective view of embodiment 100 of the present invention.

The present invention generally comprises a hole saw mandrel with integrated quick connect/disconnect saw bit retention means that does not require the use of a external quick release members. With regard to FIGS. 1-3, embodiment 100 of the present invention is comprised of an axially extending main shaft 2 which is provided with a spring support 2a, a hog ring groove 3, and a pair of retainer arm recesses 4 extending longitudinally and in diametrical opposition. In addition, a pair of axle apertures 5 extend chordally and in parallel to intersect the recesses 4. An upper support land 6 is comprised of an annular surface extending transverse to the axis, and a set of keys 9 extending distally in diametrical opposition. A pilot bit recess 7 extends axially into a spud 8 secured at the distal end of the shaft 2.

A pair of retainer arms 11 are received within the pair of recesses 4, each arm 11 including an axle aperture 12. A pair of axles 10 are positioned within axle apertures 5 and extend through apertures 12 to secure the arms 11 in rocking motion fashion within the recesses 4. Each arm 11 includes a ramped surface 14a that defines a catch 13 at the distal end, and a stop ring interface groove 15 is disposed at the proximal end of each arm 11. In addition, a lever interface recess 16 (see also FIG. 3) is formed in the inwardly facing surface of the proximal end of each arm.

An upper support ring 17 has a bore extending axially therethrough with a hog ring recess 18 formed at the distal end thereof. The bore is provided with a pair of spring recesses 19 formed in diametrical opposition, and a pair of keyways 21 extend in diametrical opposition in the proximal end of the bore and aligned in a plane orthogonal to a plane containing the spring recesses 19. A pair of engagement pins 20 protrude from the distal end surface of support ring 17. The bore of ring 17 is dimensioned to be received concentrically about shaft 2 such that the proximal end of support ring 17 impinges on land 6 with keys 9 engaged with keyways 21. Thus rotation of support 17 relative to shaft 2 is substantially restricted.

A pair of return springs 22 are disposed within spring recesses 19, the springs being configured so that the spring force is constantly urging the lower section of arms 11 radially inwardly against shaft 2. A release sleeve 23 extends about the spring support 2a and extends distally therefrom. A flange extending into the central opening of the sleeve 23 comprises a stop ring 24. and a washer 25 secured within the sleeve 23 define therebetween an annular space to accommodate a pair of lever arms 31. The lever arms 31 are disposed in diametrical opposition and are provided with a dogleg configuration. Each lever arm has a retainer arm interface lug 32 that extends from a proximal portion into recess 16 of adjacent retainer arm 11; and a stop ring interface lug 26 that extends from a distal portion into the annular surface adjacent stop ring 24.

Lever arms 31 are positioned within recesses 4 such that interface lug 32 interacts with lever recess 16, and interface lug 26 interacts with the underside of stop ring 24. Washer 27 is positioned concentrically about shaft 2 such that the distal surface of washer 27 impinges on washer land 25 (see FIG. 1) formed within the central opening of sleeve 23. A return spring 28 is secured about shaft 2 with the proximal end thereof contact with spring support 2a and the distal end impinging on washer 27, the spring force constantly urging sleeve 23 against upper support ring 17. A hog ring 30 is secured in groove 3 and recess 18 such that in conjunction with land 6 support 17 is substantially rigidly connected to shaft 2. A set of rubber bumpers 29 extend distally from the distal surface of support ring 17 and are arrayed at equal angles about shaft 2.

Figure 3:
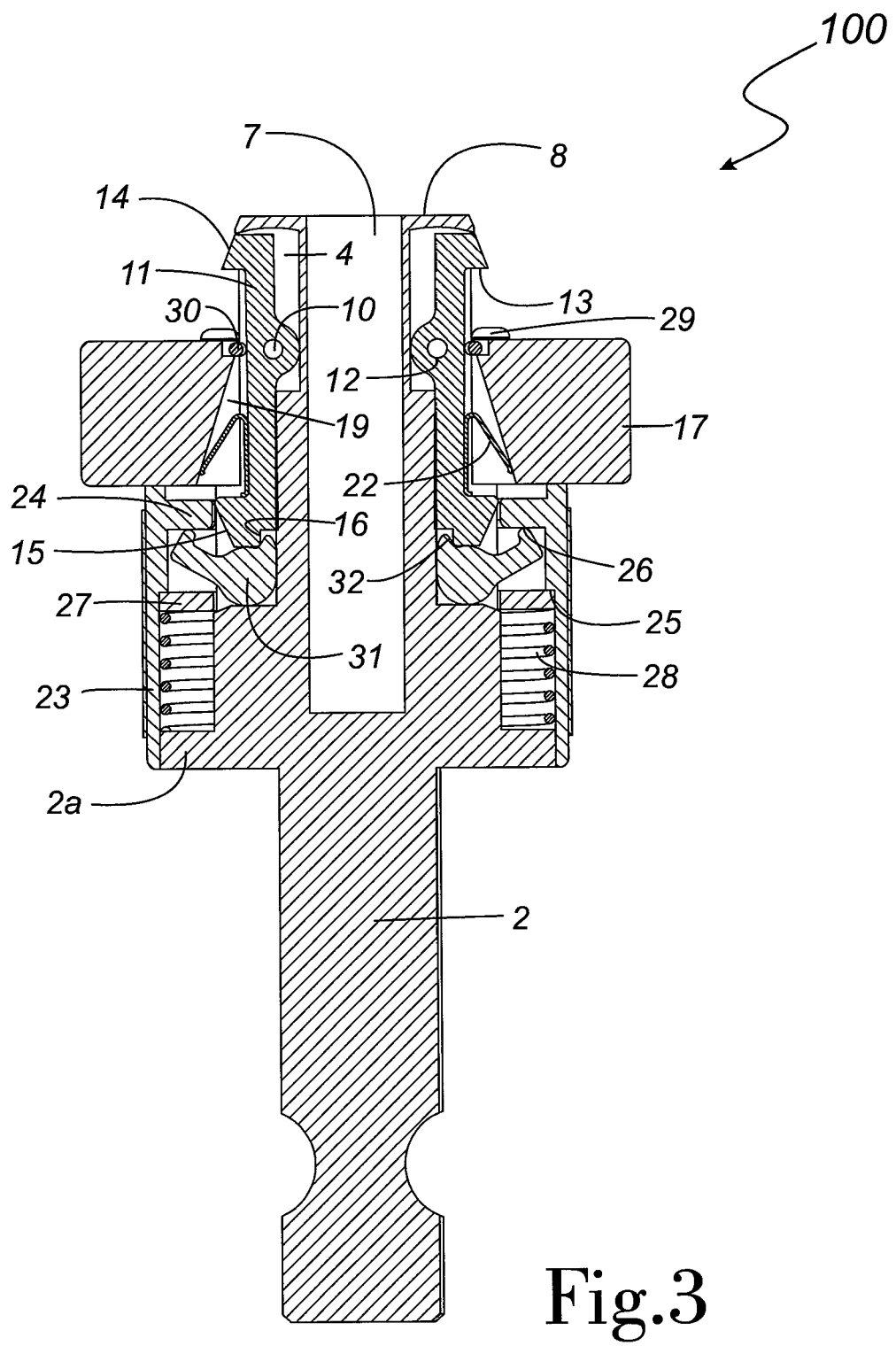
FIG. 3 is a cross-sectional elevation of embodiment 100 of the present invention in the unactuated disposition.
Figure 4:
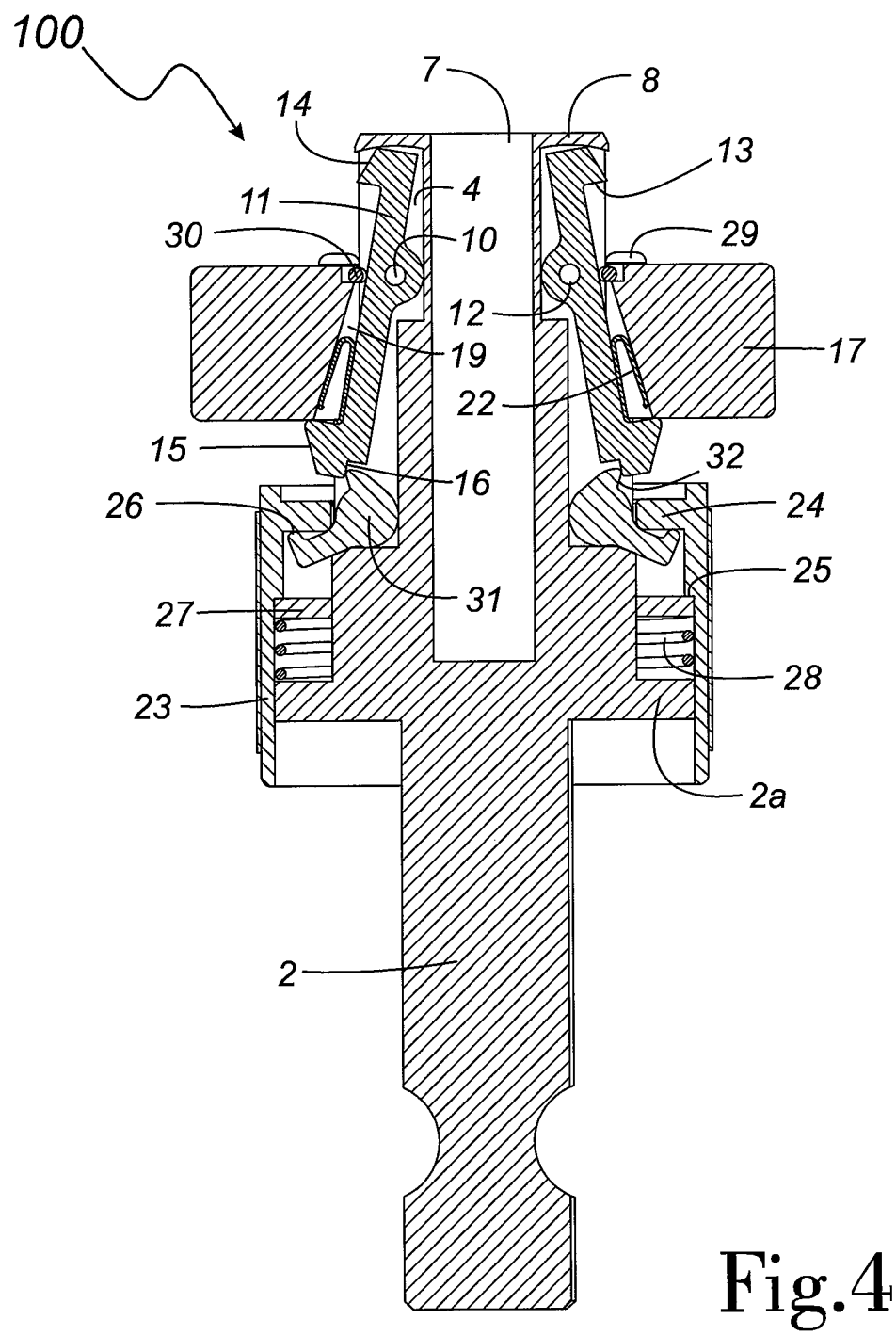
FIG. 4 is a cross-sectional elevation as in FIG. 3, showing the actuated disposition of embodiment 100 of the present invention.
Figure 5:
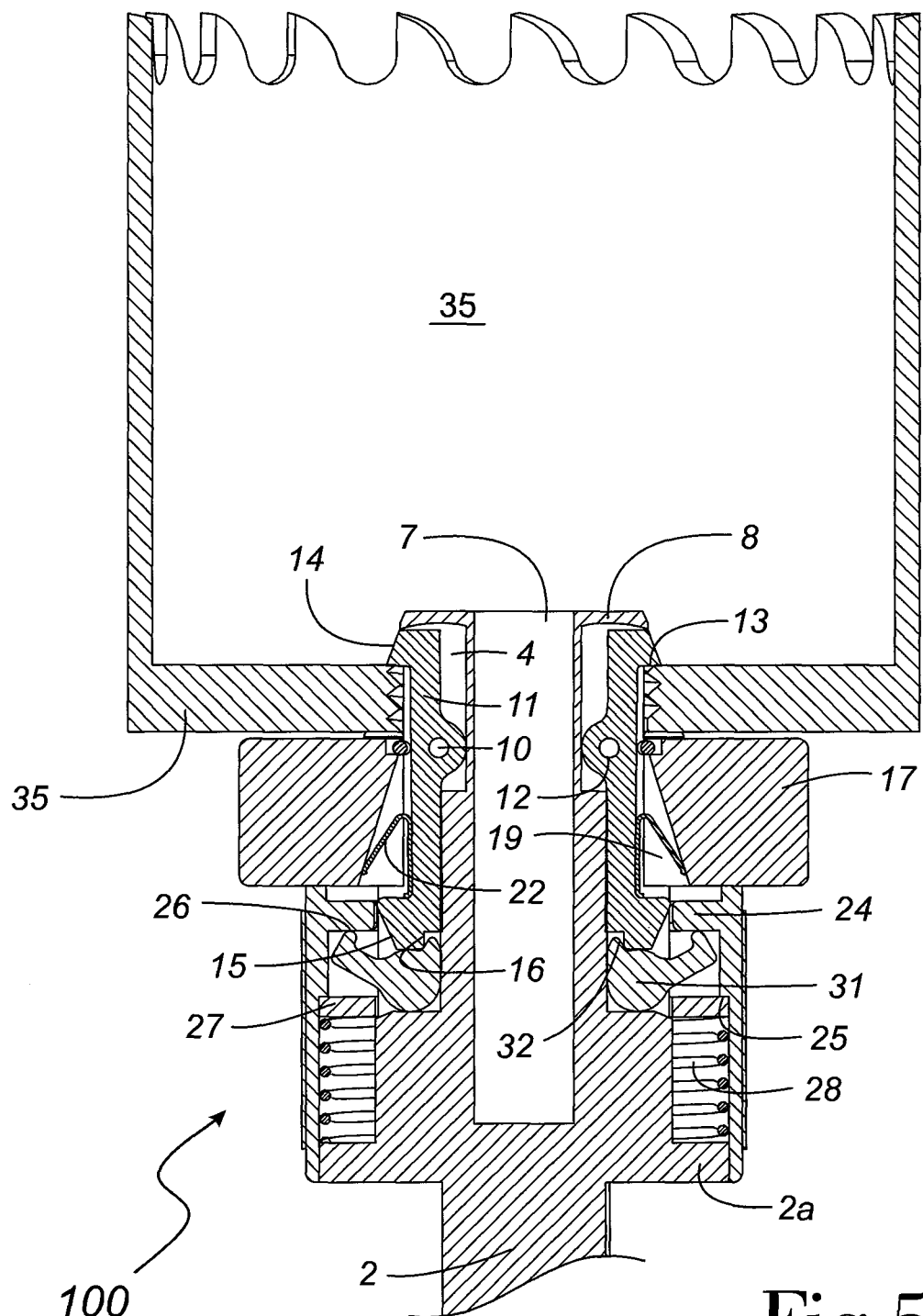
FIG. 5 is a cross-sectional elevation of embodiment 100 of the present invention secured to a typical hole saw bit.

FIGS. 3-5 are a sequence of views that illustrate the functional interactions of the components enumerated above. In FIG. 3 embodiment 100 is in the starting position where return springs 22 are forcing the proximal section (section below arms 11 pivot point) of retainer arms 11 against shaft 2. Note that retainer arms 11 are locked in the position shown as shaft 2 restricts rotation in one direction and the impingement of stop ring 24 on tapered outer surface 15 restricts rotation in the other direction. Also, in the absence of an external force acting on sleeve 23, stop ring 24 will remain in the position shown (restricting retainer arms 11 rotation) as spring 28 is urging release sleeve 23 against upper support 17.

In FIG. 4 the user has pulled release sleeve 23 proximally and as a result, stop ring 24 impinges on interface lugs 26 and urges the lever arms 31 to rotate the interaction between interface 26 with. This rotation of lever arms 31 in turn rotates interface lugs 32 in recess 16, urging retainer arms 11 to rotate about axles 10 so that the proximal ends spread radially from the shaft 2. Catch 13 is no longer protruding radially past the surface of spud 8), and the user is now able to mount a saw bit 35, as shown in FIG. 5. That is, it is now possible by positioning spud 8 within the central mounting hole located 1 n saw bit 35 and then rotating (while applying slight downward pressure) saw bit 35 until the pair of engagement pin holes on saw bit 35 align with engagement pins 20 at which point saw bit 35 will slide further down spud 8 until the rear surface of bit 35 comes into contact with and slightly compresses rubber bumpers 29. The user then releases sleeve 23 so that springs 22/28 will return the assembly to the initial position as shown in FIG. 5 in which catches 13 on lever arms 11 retain bit 35 in the position shown.

In order to remove bit 35, the user will again pulls down on sleeve 23 where as discussed before, the assembly will return to the position shown in FIG. 4, the catches 13 will retract, allowing bit 35 to be removed. It should be noted that rubber bumpers 29 are not essential to the design as bit 35 would still be retained in their absence. The purpose of bumpers 29 is to provide the assembly with a predetermined amount of compliance such that saw bits with varying thicknesses of back plates from different manufactures will not have any excessive play (rattle) when mounted to the present invention. This function could be provided for by other obvious means such as a pin and spring combination, a spring positioned concentrically about spud 8, elastomeric washers, elastomeric 0-rings, and the like.

There are many other means of rotating the lever arms disclosed above. For example, if the retainer arms 11 pivot point were moved to a point below stop ring 24, a simple ramped surface placed on arms 11 could interact with stop ring 24 to rotate the lever arms radially inward when the outer sleeve is pulled downward. In general there are numerous mechanism known in the art that could be used to move/rotate a set of retainer arms.

Figure 6:
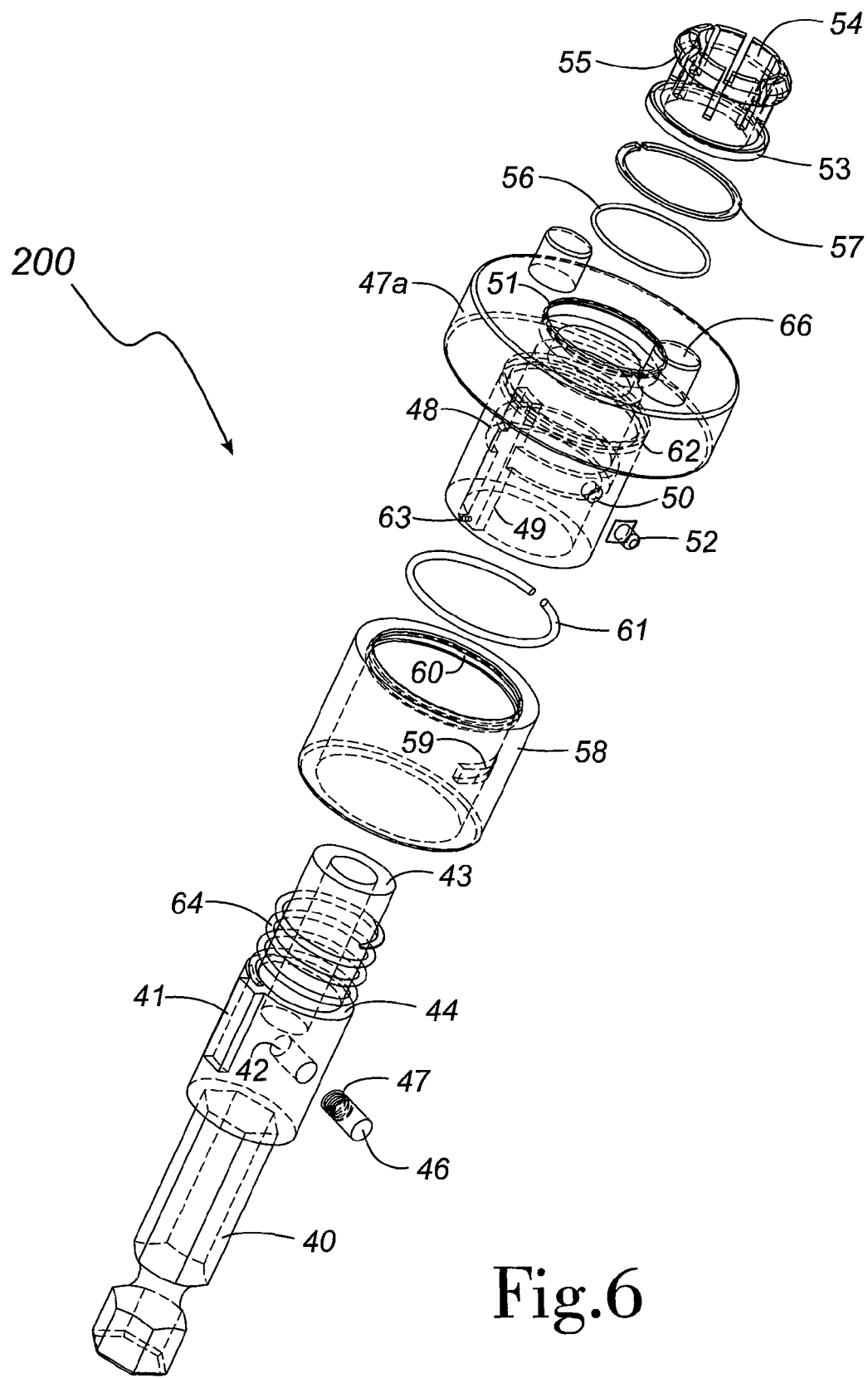
FIG. 6 is a exploded perspective view of embodiment 200 of the present invention.
Figure 7:
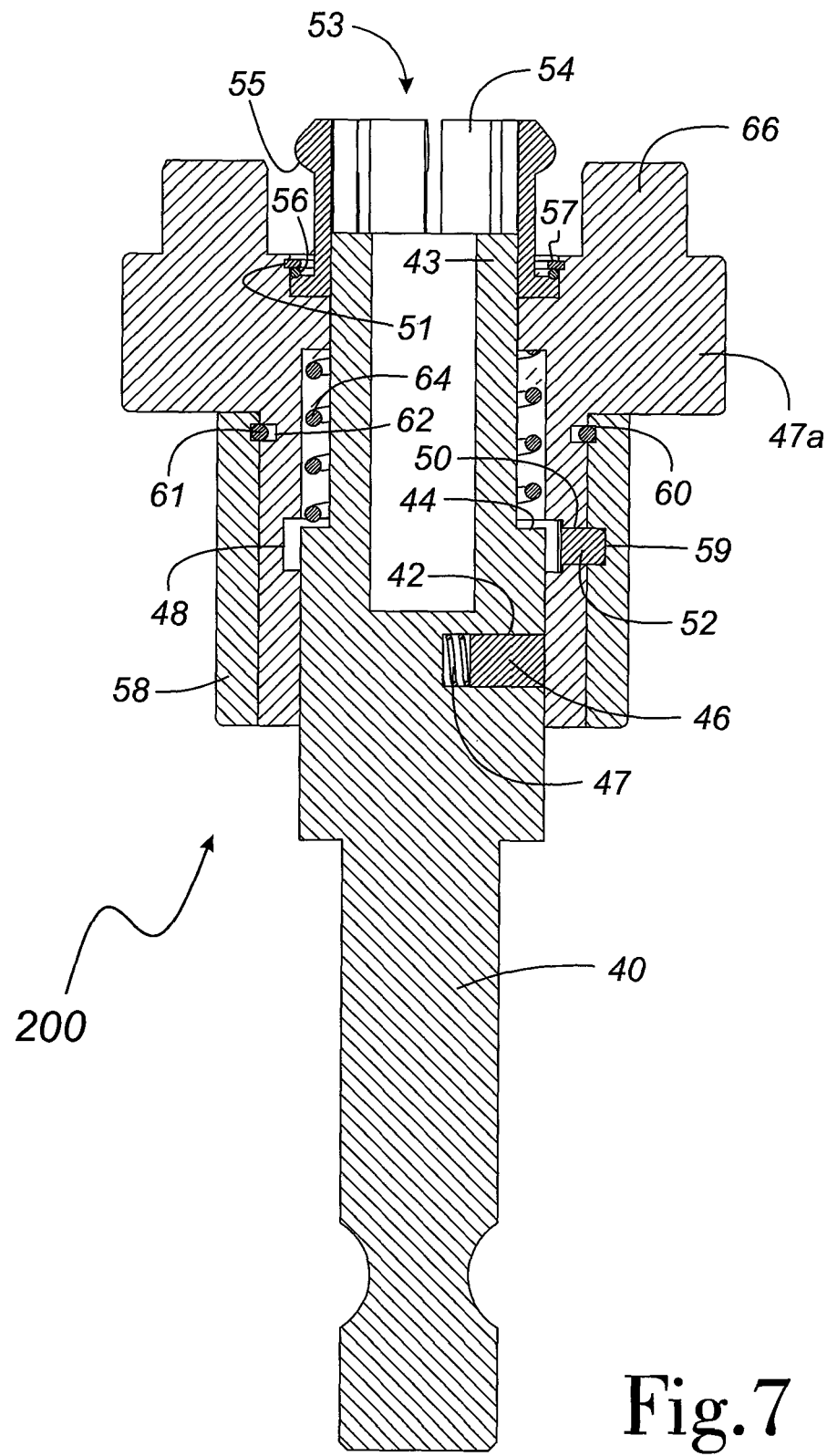
FIG. 7 is a cross-sectional elevation of embodiment 200 of the present invention.

FIG. 6 illustrates a further embodiment 200 of the present invention where the primary difference from previous embodiment 100 is the use of a set of retainer arms connected at their base that slide rearward to provide the saw bit retention function. In detail, embodiment 200 comprises a main shaft 40 having a key 41 protruding radially from the distal end thereof, and a catch aperture 42 adapted to secure a catch pin 46. A tubular cylindrical spud 43 extends axially and distally from the shaft 40, and an annular spring land 44 is formed at the distal end of spud 43. A catch pin spring 47 is positioned within aperture 42 such that one end abuts main shaft 40 and the other abuts catch pin 46 to urge pin 46 radially outwardly.

An upper support ring 47a is received concentrically about spud 43 and has an interior bore that is provided with an interior catch groove 48 that may engage catch pin 46, so that when pin 46 is engaged with groove 48 the upper support 47a is unable to move in the axial direction relative to shaft 40. A keyway 49 is formed in the interior bore of ring 47a and is disposed to engage key 41, so that movement of upper support 47a relative to shaft 40 is substantially limited to the axial direction of shaft 40. A release button hole 50 is formed in the sidewall of ring 47*a* to house a release button 52. The release button 52 is positioned to intermittently interact with catch pin 46 such that when catch pin 46 is engaged with catch groove 48, pressing release button 50 radially inward disengages catch pin 46 from catch groove 48, The distal end of the interior bore of ring 47*a* includes a circlip groove 51 that is adapted to retain circlip 57 and O-ring 56. A release sleeve 58 is disposed about the proximal end of ring 47A and secured thereto by hog ring 61 received in groove 62 formed in the outer surface of the proximal end of ring 47*a* and the groove 60 formed in the interior bore of release sleeve 58. A main spring 64 extends about shaft 40 within an annular space defined between shaft 40 and upper support ring 47*a*, with one end in contact with spring land 44 while the other end contacts upper support ring 47*a*. A pair of engagement pins 66 extend from the distal end surface of upper support ring 47*a* to torque-engage interchangeable drill bits 65. A collet 53 includes a ring portion received in annular recess in the distal face of ring 47*a* and supporting a plurality of retainer arms 54, each having a catch 55 extending radially outwardly from a distal end thereof, and a chamfered distal outer edge to guide the arms into the mounting hole of a bit. Note that collet 53 is secured to the ring 47*a* by circlip 57 and 0-ring 56.

The release sleeve 58 is provided with a release channel 59 formed in the interior bore surface and extending in a short circular arc that engages release button 50. The channel 59 his provided with a depth that varies smoothly with angular excursion. Thus movement of release sleeve 58 relative to upper support 47*a* is thus substantially limited to rotational displacement. A stop pin 63 is rigidly fixed to upper support 47*a* and disposed to interact with key 41 in keyway 49 to limit the movement of support 47*a* relative to shaft 40.

Figure 8:
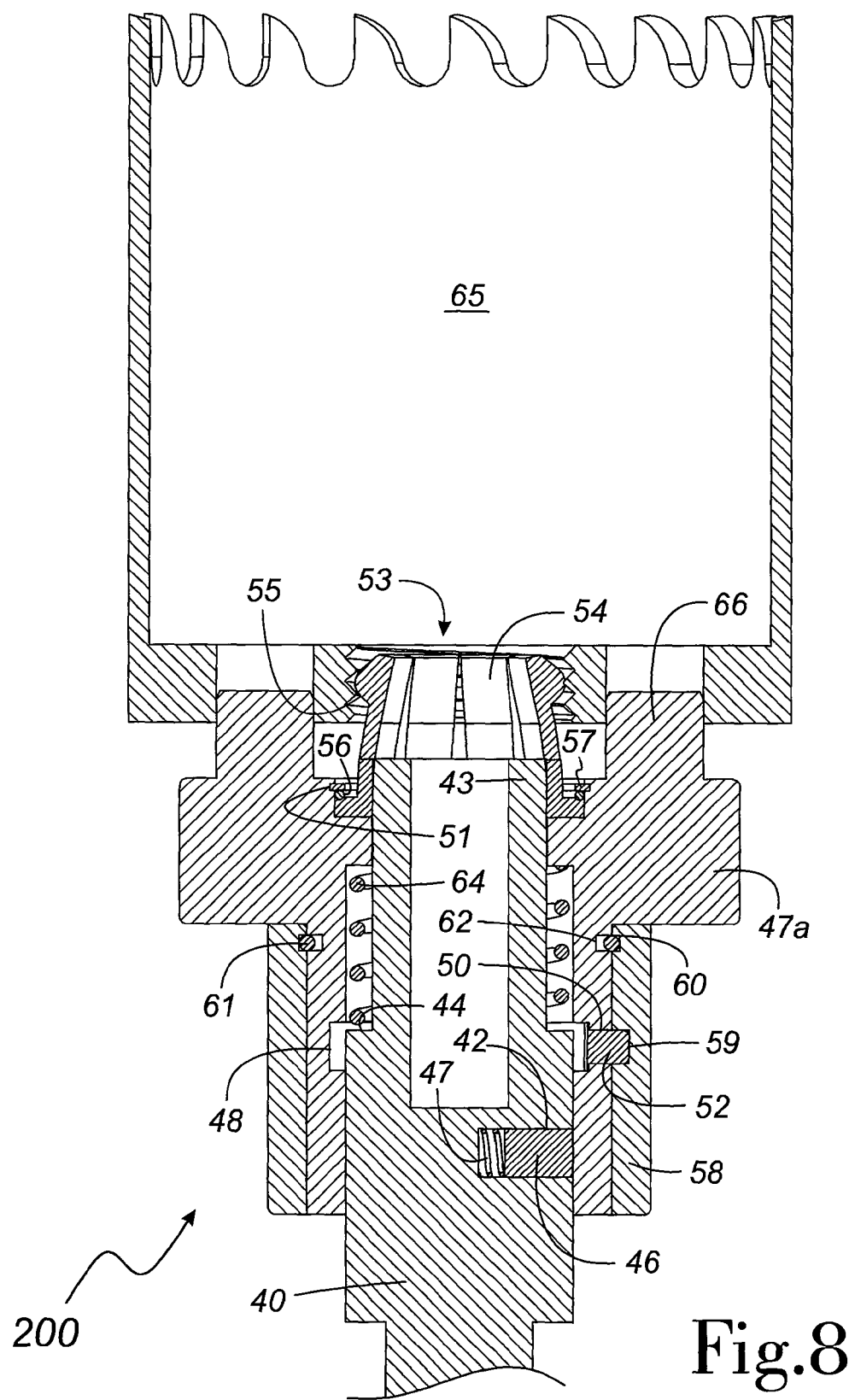
FIG. 8 is a cross-sectional elevation of embodiment 200 of the present invention being joined to a typical hole saw bit.
Figure 9:
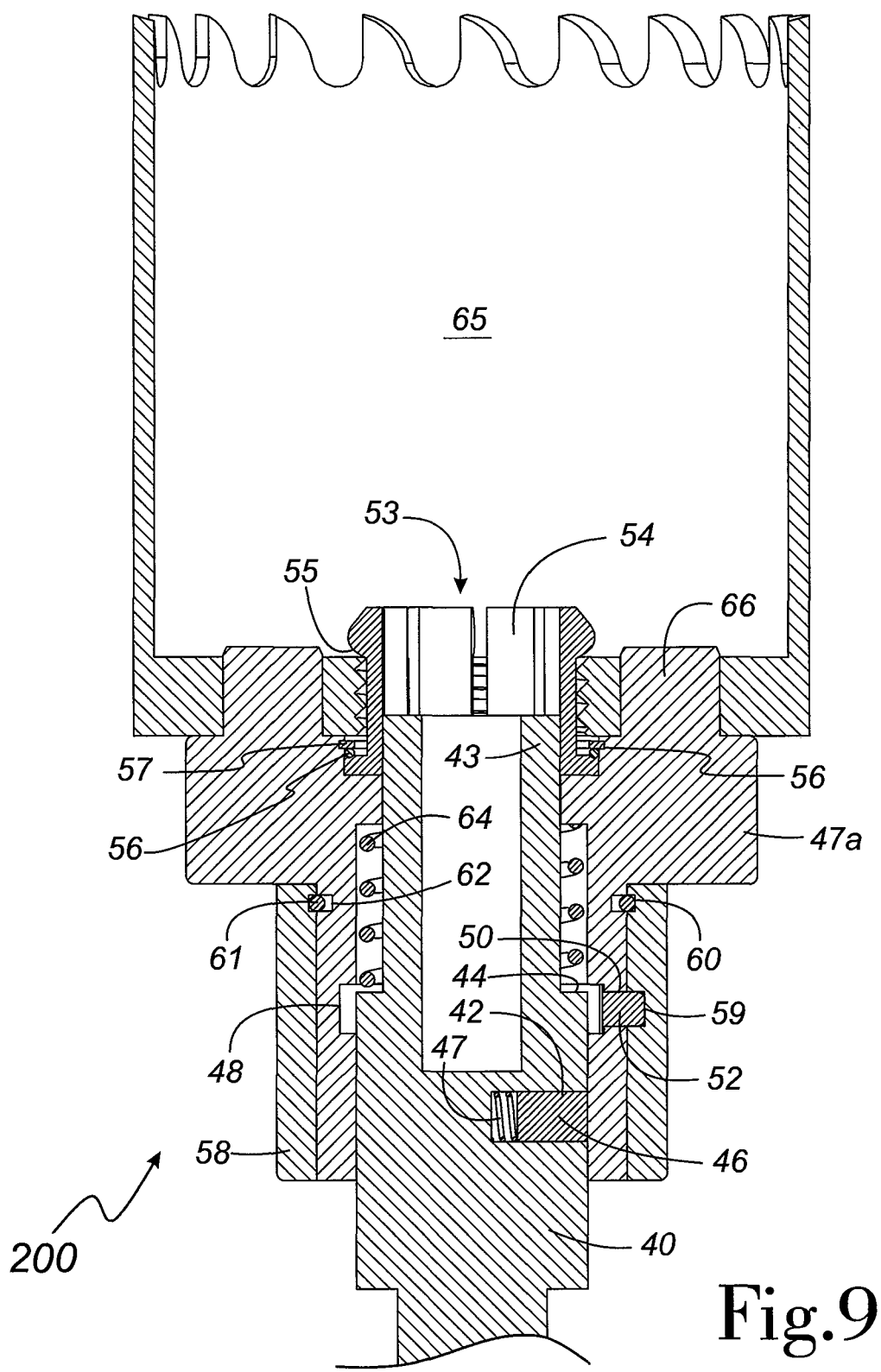
FIG. 9 is a cross-sectional elevation of embodiment 200 of the present invention secured to a typical hole saw bit.

FIGS. 7-10 are a sequence of views that illustrates embodiment 200 of the present invention in operation. With regard to FIG. 7, embodiment 200 is in the starting position in which main spring 64 has urged upper support 47*a* into the distal position shown. Note that since spud 43 is only partially inserted into collet 53, retainer arms 54 are able to bend radially inward. It would also be possible to configure collet 53 such that retainer arms 54 were, to some degree, preformed such that they bent radially inward in the position shown (as in FIG. 8). With reference to FIG. 8, the user is mounting saw bit 65 by aligning the center aperture of bit 65 with collet 53 and applying downward pressure while at the same time rotating bit 65 until engagement pins 66 align with their matching apertures on bit 65. As shown, this downward force in conjunction with the interaction of the ramped section of catches 55 with the edge of the saw bit 65 center aperture bends the retainer arms 54 radially inward as shown. In FIG. 9, the user has continued to apply downward pressure resulting in the retainer arms 54 being fully inserted in bit 65 and the back of bit 65 is in contact with upper support 47*a*.

Figure 10:
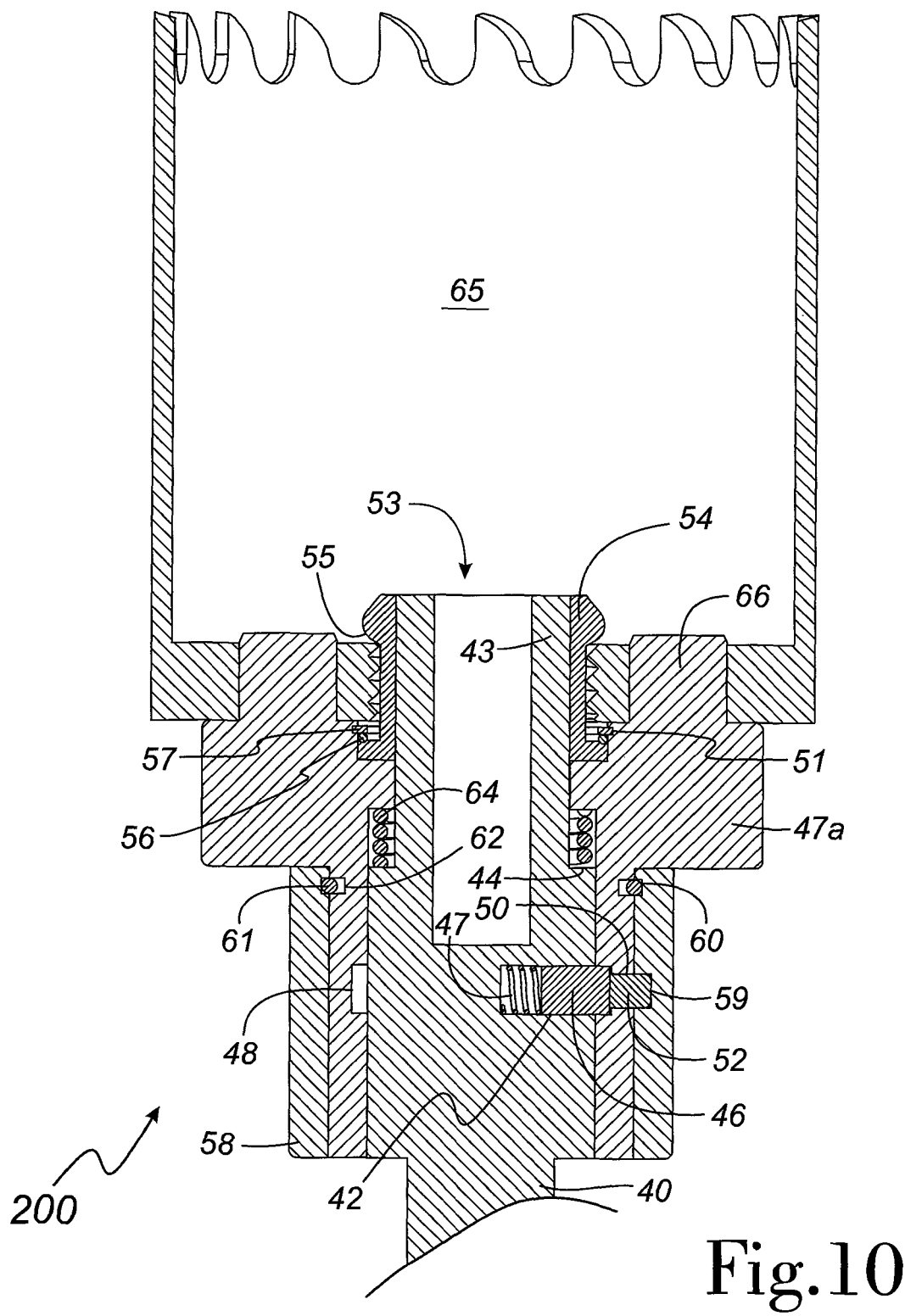
FIG. 10 is a cross-sectional elevation of embodiment 200 of the present invention showing the bit release disposition.

In FIG. 10 the user has continued to apply downward pressure, forcing upper support 47*a* downward relative to shaft 40 to the point where catch pin 46 is engaged with catch groove 48. The user may now release saw bit 65 as the assembly will remain in the position shown until catch pin 46 is disengaged. In addition, since spud 43 is fully inserted into collet 53, retainer arms 54 are no longer able to bend radially inward and catches 55 will retain saw bit 65 in the position shown. To remove saw bit 65, the user rotates release sleeve 58 and, due to the interaction between the ramped varying depth of 59 impinging on button 52, release button 52 is urged radially inward. This disengages catch pin 46 from groove 48, allowing spring 64 to return the assembly into the position shown in FIG. 8 releasing the saw bit 65 so that it may be removed. The process of securing, using, and releasing saw bits 65 is simple, quick, and reliable.

It should be noted that it would be possible to configure embodiment 200 such that the user interacts with release button 52 directly, in which case release sleeve 58 would no longer be needed. In general release sleeve 58 is a convenience feature as it removes the need to hunt for or find release button 52. Main spring 64 is a convenience feature as well as it only serves to minimize user interaction with the assembly in the engagement/disengagement process (the user does not have to physically move upper support 47*a*), where its absence would result in obvious changes in this engagement/disengagement process. Finally, another non-essential element is 0-ring 56 which only serves to provide compliance such that saw bits with varying thicknesses of back plates will mount onto embodiment 200 without any excessive play which can result in a rattling sound that could possibly annoy the user. This function could be provided for in many other different ways as discussed in embodiment 100.

Figure 11:
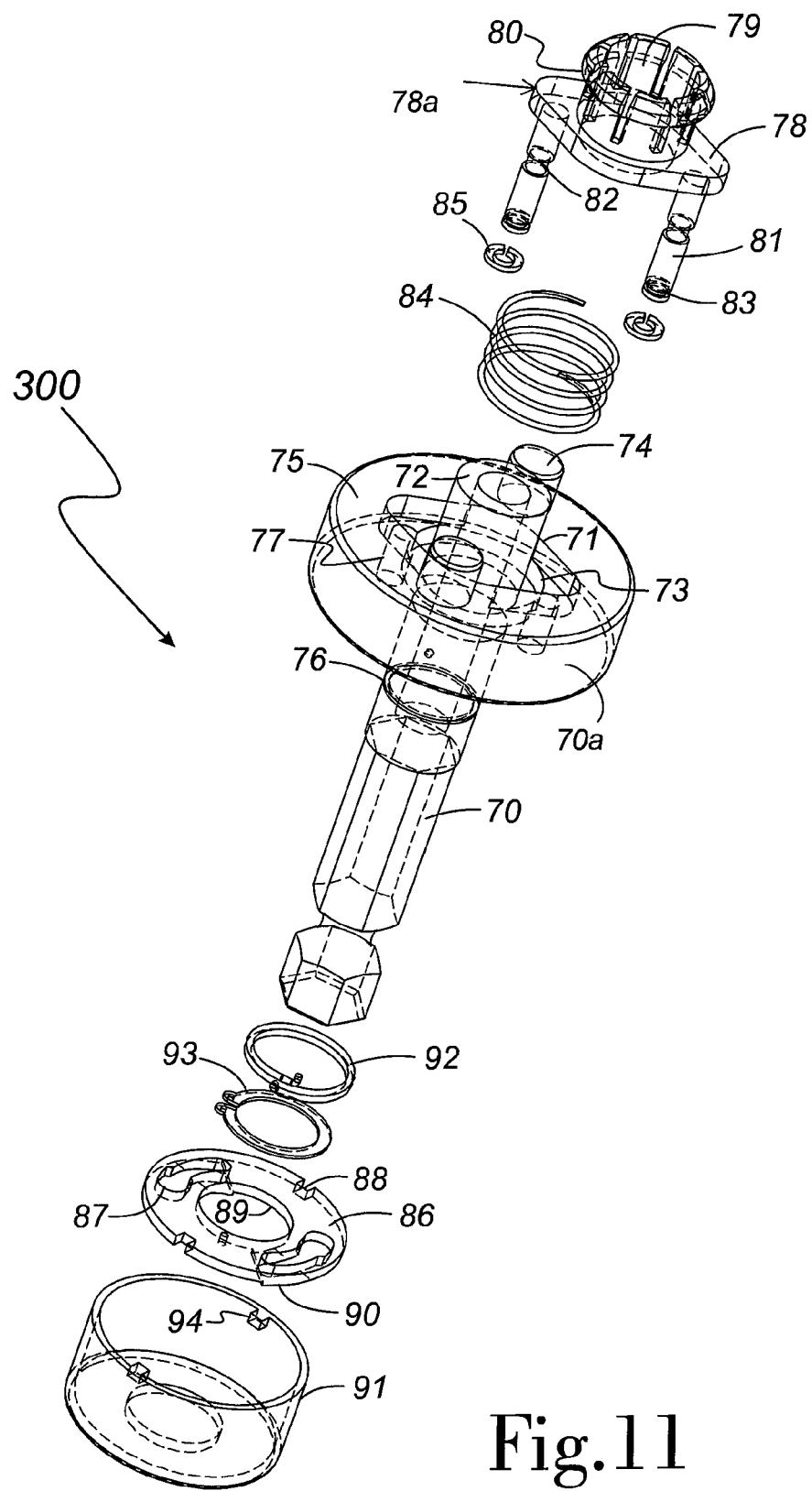
FIG. 11 is a exploded perspective view of embodiment 300 of the present invention.

With regard to FIG. 11 a further embodiment 300 of the invention differs from embodiment 200 in that the saw bit retention component is the only member that slides forward in the disengaged position; and that the use of a rotating member to lock the saw bit retention component in the engaged/rearward position. In detail, embodiment 300 includes a main shaft 70 having a tubular cylindrical spud 72 extending from the distal end thereof, and a radial flange 70*a* at the distal end having a distal end surface 75. A collet recess 71 is formed in the distal end surface 75, and is provided with a rhomboidal configuration centered about the axis of the shaft 70. A spring recess 73 extends coaxially into the collet recess 71 to accommodate main spring 84. The distal end surface 75 also supports a pair of engagement pins 74 to torque-engage a complementarily-formed hole saw bit.

The embodiment 300 also includes a collet 78*a* having a plate-like base 78 that is rhomboidal in profile and configured to be received in recess 71 of end surface 75. Extending from base 78 are a plurality of retainer arms 79 extending distally and arrayed concentrically about the axis of the shaft 70. Each retainer arm 79 is provided with a catch 80 positioned at the distal end thereof. A pair of retainer shafts 81 extend proximally from base 78 and are disposed to slidably engage in a pair of apertures 77 extending through the flange 70*a*. Each retainer shaft 81 is provided with a retainer groove 82 circumscribing a medial portion thereof, and a stop washer groove 83 at the proximal end. The main spring 84 positioned in spring recess 73 pushes distally against collet 78. A pair of stop washers 85 are engaged in grooves 83 and serve to limit the distal movement of collet 78 and maintain the assembly.

A locking plate 86 has a central opening 89 through which the shaft 70 extends. The plate 86 is provided with a pair of keyhole openings 87 disposed in diametrical opposition, each subtending a small arc about the axis of the opening 89 and having one wide end and one narrow end. The shafts 81 extend through apertures 77 and protrude through keyhole openings 87 so that when the narrow section of keyholes 87 are engaged with grooves 82 of shafts 81 the collet 78 is held substantially fixed relative to shaft 70. A cup-like release sleeve 91 is secured concentrically about the shaft 70 and the locking plate 86. A pair of notches 88 extend into the periphery of the locking plate 86, and a complementary pair of keys 94 protrude inwardly from the sidewall of release sleeve 91. The keys 94 engage the notches 88 such that sleeve 91 is unable to rotate relative to locking plate 86.

The proximal surface of locking plate 86 is provided with a pair of ramped surfaces 90 that are adjacent to the keyhole openings 87. A torsional return spring 92 is disposed concentrically about shaft 70 so that one end is fixed to locking plate 86 and the other fixed to shaft 70, with the spring force urging locking plate 86 into the engaged position (narrow section of keyholes 87 engaged with groove 82). A circlip 93 is secured within circlip groove 76 to retain release sleeve 91 in its axial position relative to shaft 70

Figure 12:
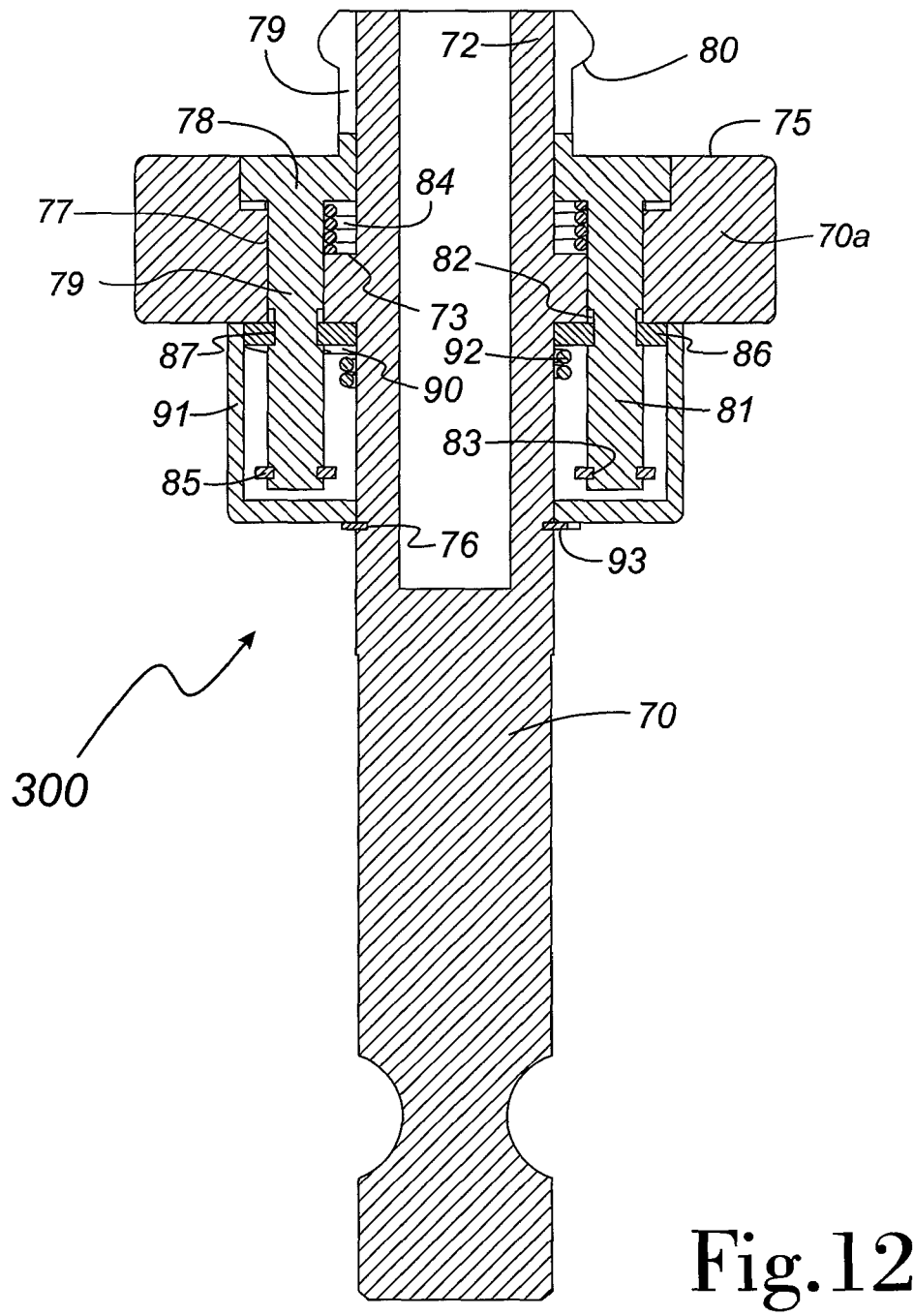
FIG. 12 is a cross-sectional elevation of embodiment 300 of the present invention.
Figure 13:
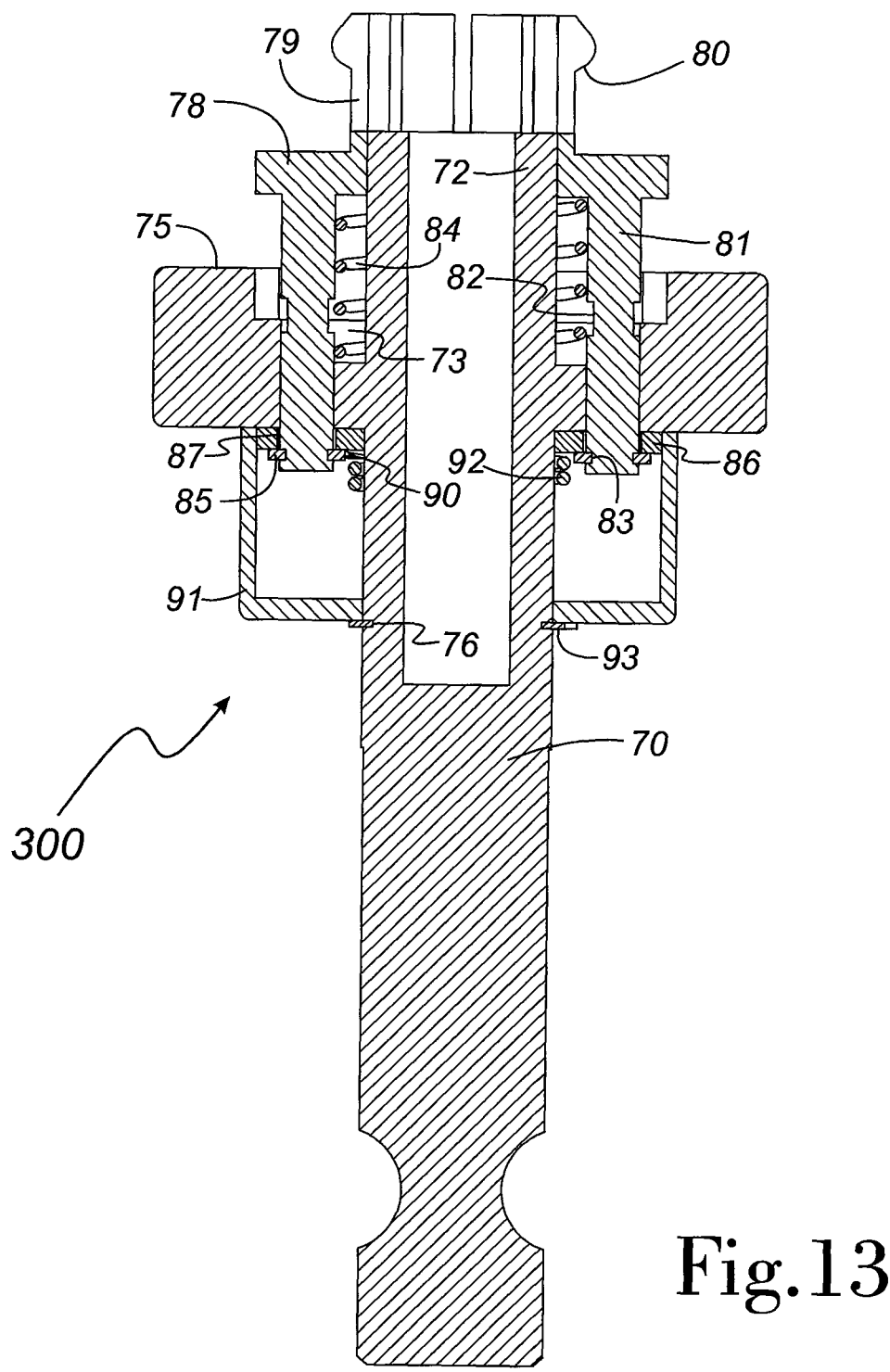
FIG. 13 is a cross-sectional elevation of embodiment 300 of the present invention in the actuated disposition.

FIGS. 12-13 illustrate embodiment 300 of the invention in operation. Due to the similarities between embodiment 200 and embodiment 300 a full set of operational figures are not required as many steps are correspondingly similar. Starting with FIG. 12 embodiment 300 is restrained in the starting position as the narrow sections of keyholes 87 are engaged with grooves 82 on shafts 81. In FIG. 13 release sleeve 91 has been rotated which in turn has rotated locking plate 86 due to the interaction of keys 94 with notches 88. As a result, the narrow section of keyholes 87 have been rotated away from and disengaged with grooves 82 allowing spring 84 to urge collet 78 into the forward position as shown. At this point and similar to the situation in FIGS. 8-9 of embodiment 200, and the user is able to mount the saw bit onto collet 78 where further downward pressure will again align grooves 82 with keyholes 87. This alignment will then allow spring 92 to rotate locking plate 86 such that the narrow section of keyholes 87 is re-engaged with grooves 82 returning the assembly to the position shown in FIG. 12. The ramped surface 90 surrounding the narrow section of keyholes 87 is an optional feature that utilizes a simple wedge mechanism to draw collet 78 further downward during engagement of the narrow section of keyholes 87 with grooves 82 such that any excessive play between upper support surface 75 and the saw bit is substantially minimized.

Figure 14:
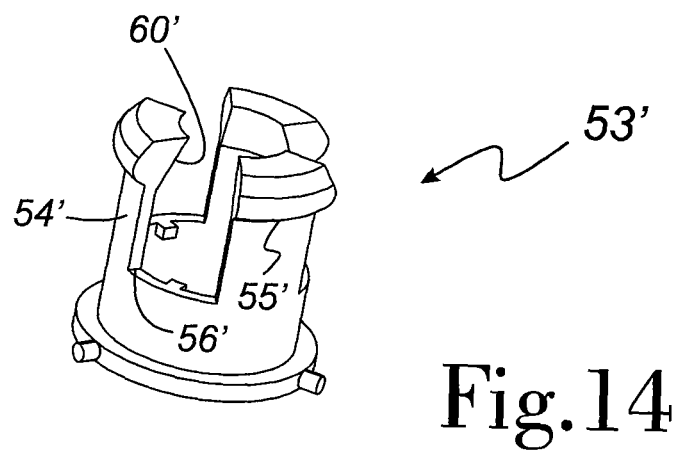
FIG. 14 is a perspective view of collet 53' of the present invention.
Figure 15:
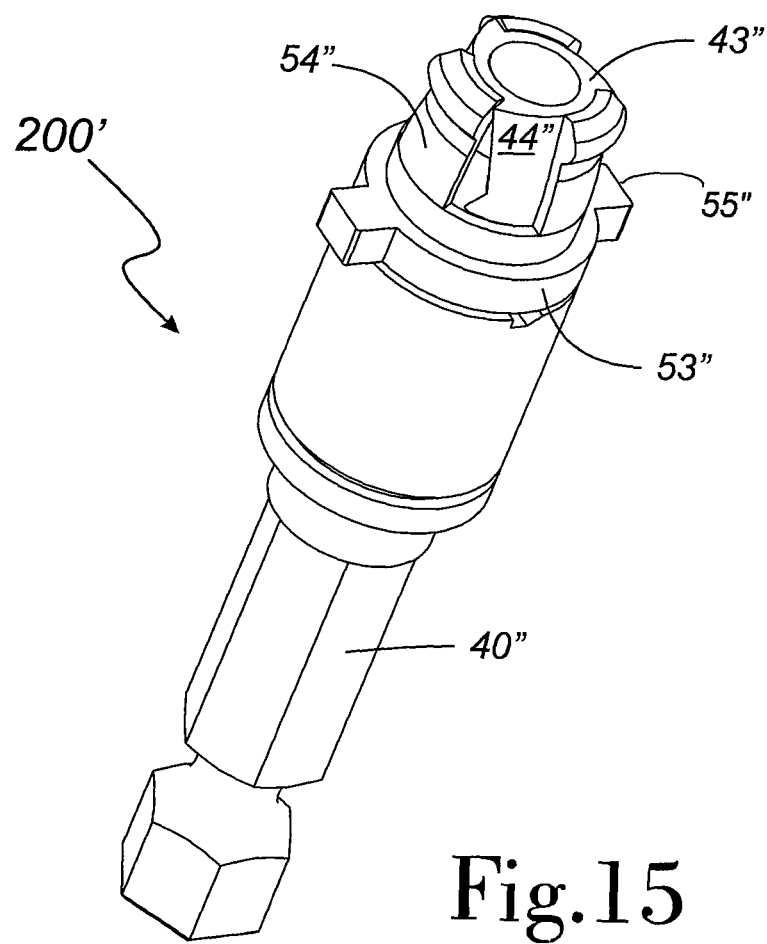
FIG. 15 is a perspective view of assembly 200' of the present invention.

FIGS. 14-15 illustrates alternative collet and spud configurations. In FIG. 14 collet 53' is comprised of a trio of retainer arms 54', each having a catch 55' located at the end of arm 54', and a set of interior, inwardly flaring surfaces 60' located opposite catches 55'. The flaring surfaces 60' may be engaged with a complementarily-formed chamfered spud, so that the distance collet 53' must travel (with respect to the spud) before retainer arms 54' are allowed to bend fully inward is minimized. Specifically, the base of retainer arms 54' at 56' need only travel to the proximal edge of the spud depression to allow for full radially inward movement as opposed to the distal edge or tip of the spud as in previous collet embodiments. Of course if collet 53' were used with a spud without a similar depression as in previous embodiments, the interaction of interface 60' with the distal end of the spud would expand retainer arms 54' radially outward as collet 53' is drawn downward around the spud. FIG. 15 illustrates an alternative collet and spud assembly 200' comprising of a main shaft 40" having a spud 43" extending distally therefrom and ramped interfaces 44" of smoothly varying radii formed on the spud. A collet 53" further includes a plurality of retainer arms 54" and rotating keys 55". The difference between previous embodiments is that rotational as opposed to downward movement of collet 53" provides the saw bit retention effect. Specifically, the interaction of arms 54" with interfaces 44" as collet 53" is rotated expands arms 54" outward.

Figure 16:
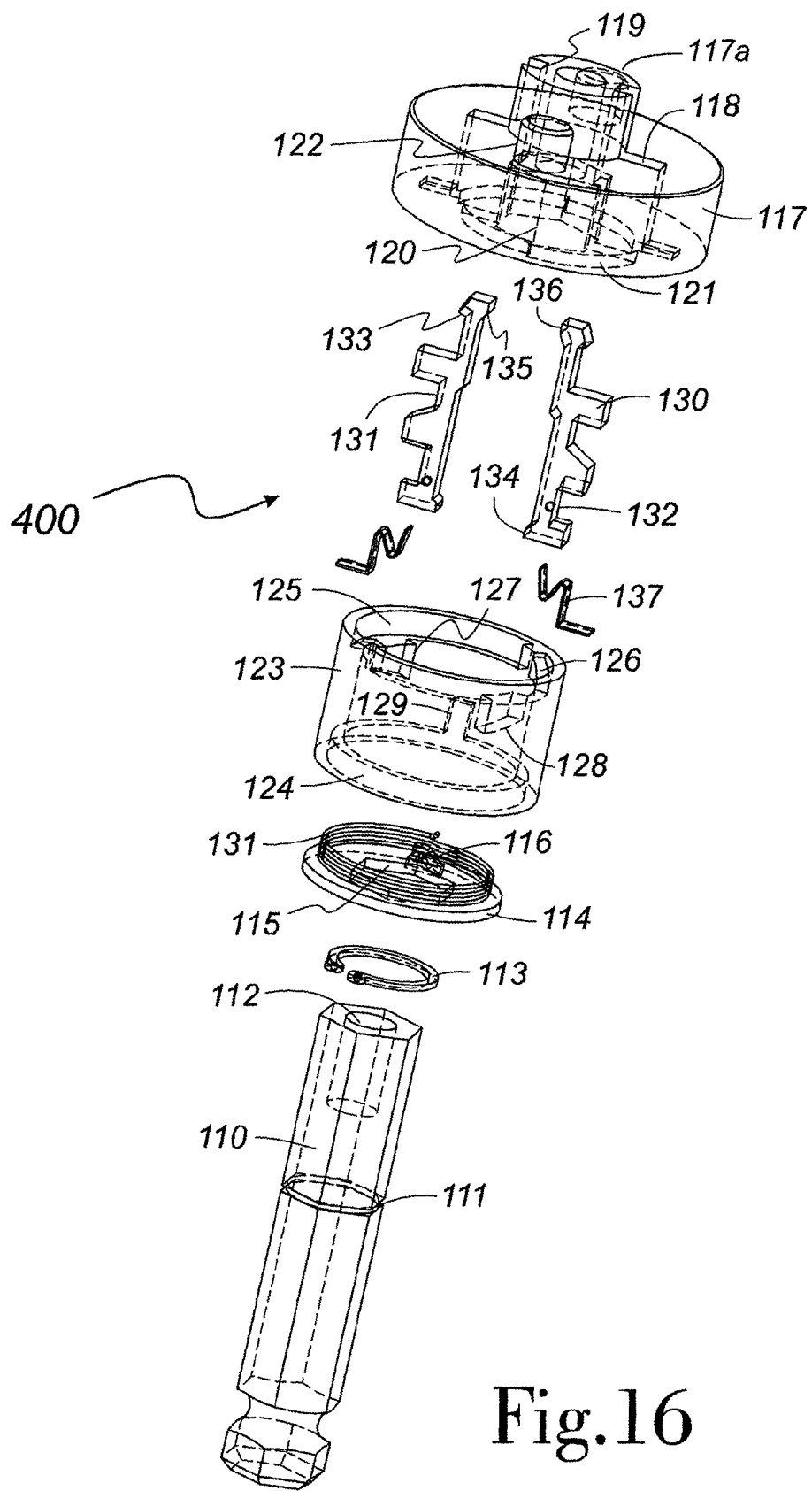
FIG. 16 is a exploded perspective view of embodiment 400 of the present invention.
Figure 17:
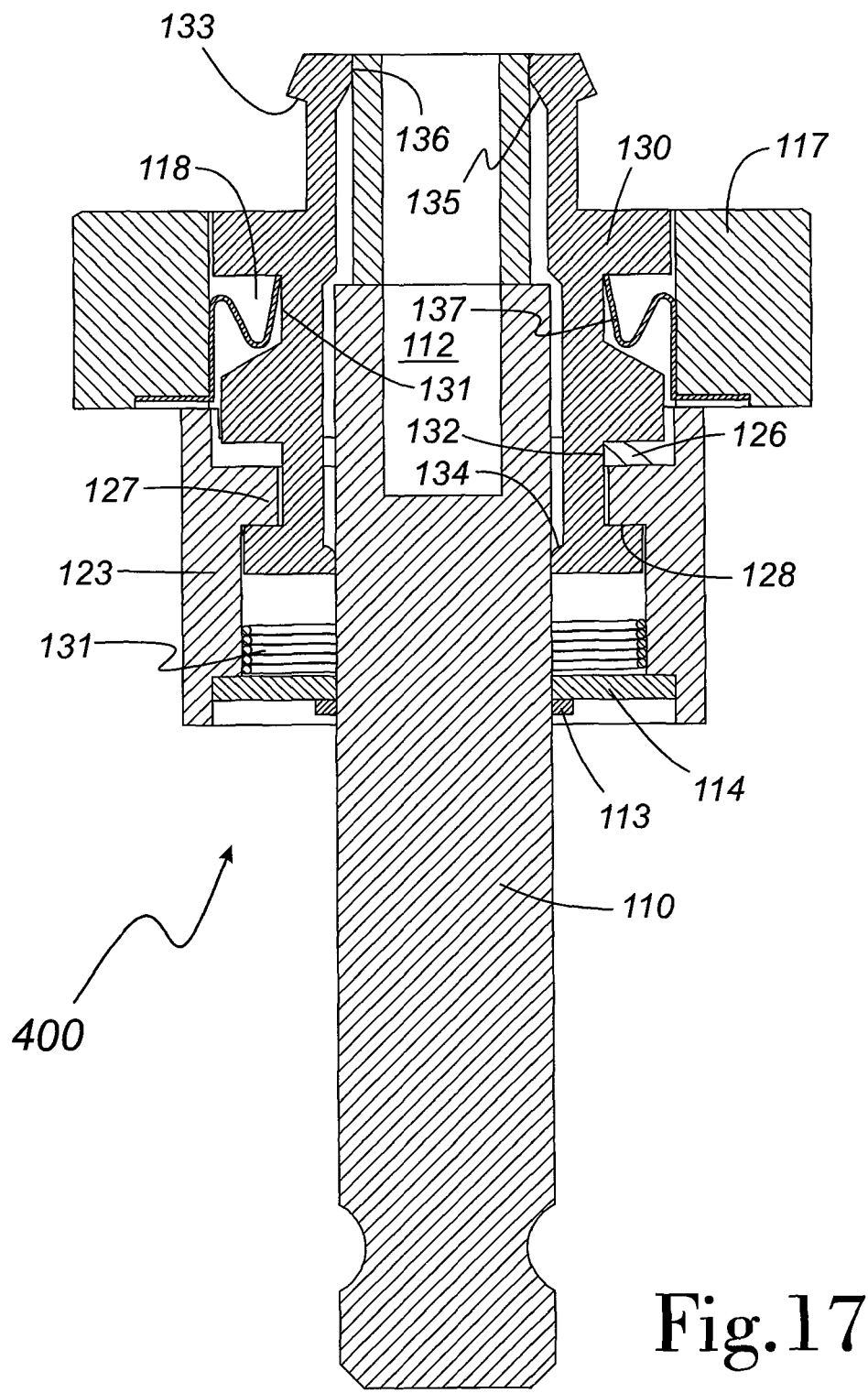
FIG. 17 is a cross-sectional elevation of embodiment 400 of the present invention.
Figure 18:
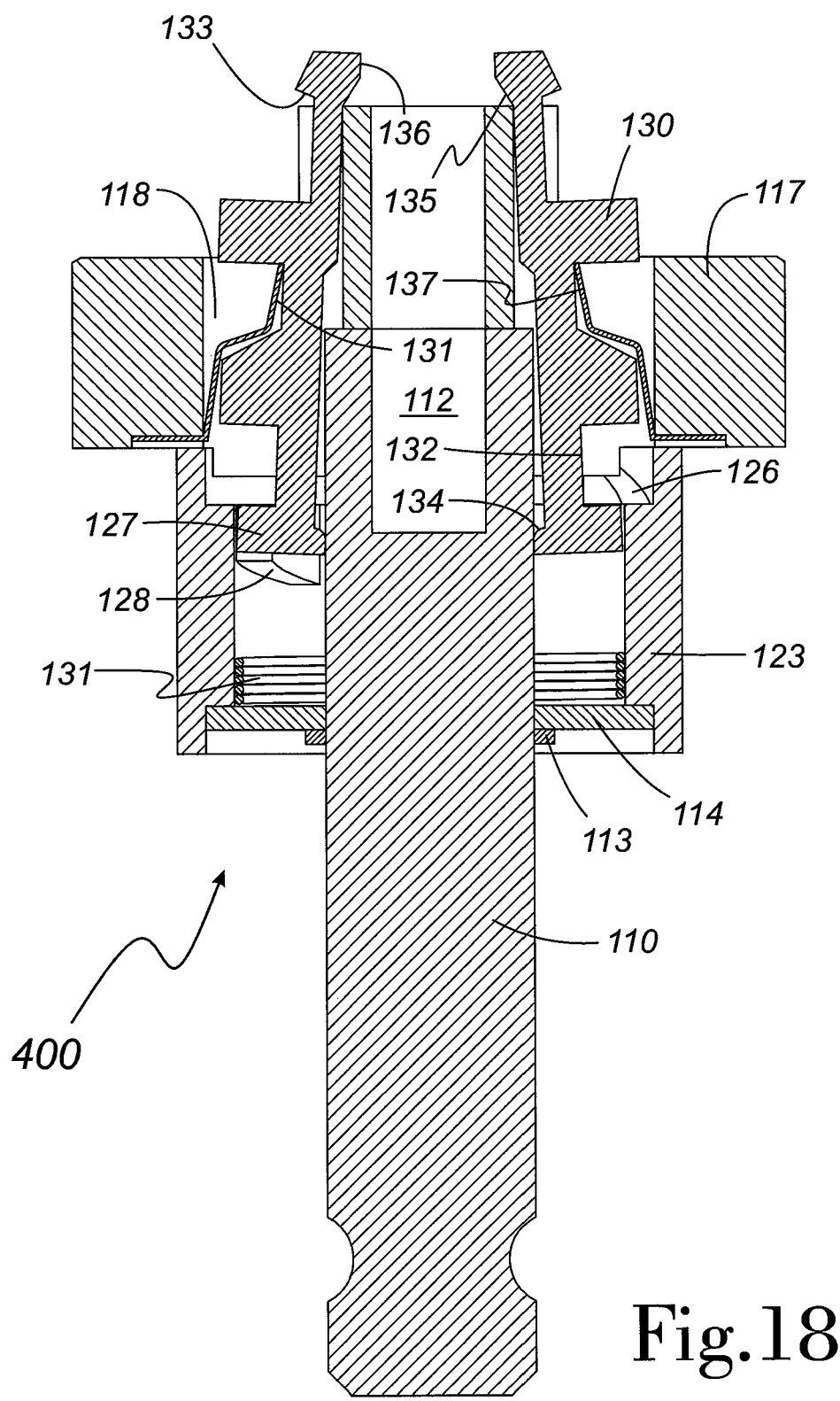
FIG. 18 is a cross-sectional elevation of embodiment 400 of the present invention shown in the actuated disposition.

In general there are many other embodiments that could be constructed in accordance with the features of the invention. For example, embodiment 400 of the present invention utilizes a set of individual retainer arms as in embodiment 100 that comprise a feature substantially similar to interface 60' and are slid rearward as in embodiment 200 and locked into the engaged position via a rotational mechanism as in embodiment 300. With reference to FIGS. 16-18, embodiment 400 comprises a main shaft 110 having a circlip groove 111 circumscribing a medial portion of the shaft, and a pilot bit aperture 112 extends axially into the distal end of shaft 110. A circlip 113 is secured in groove 111, and a washer 114 is positioned against circlip 113. The washer 114 includes a central aperture 115 with a shape substantially similar to the exterior shape of shaft 110, such as, but not limited to, the hex shape shown. As spring catch 116 is supported on washer 114, and an upper support ring 117 is secured about the distal end of shaft 110. The ring 117 is provided with a pair of diametrically opposed arm recesses 118 extending into the interior surface of the central bore 120 of the ring 117.

A spud 117a extends distally from the ring 117, and includes diametrically opposed slots 119 that are each coextensive with one of the recesses 118. A pair of engagement pins 122 extend distally from the distal face of ring 117 to torque-engage a saw bit, as described previously. An outer sleeve 123 is positioned between upper support 117 and washer 114 such that movement of outer sleeve 123 is substantially restricted to rotation. A annular washer recess 124 is formed in the proximal interior surface of sleeve 123, and an annular hub recess 125 is formed in the distal interior surface of sleeve 123. Recess 125 interacts with hub 121 to position sleeve 123 concentrically about shaft 110. A plurality of engagement keys 127 extend radially inwardly from the interior surface of sleeve 123, each key 127 including a distal-facing release ramp surface 126 and a cam-like wedge surface 128 that is proximal-facing. A spring recess 129 extends distally from the recess 124 in the interior surface of sleeve 123.

A pair of retainer arms 130 are slidably disposed within recesses 118, each arm having a distal catch 133 to engage a tool, a distal internal surface 136 that is cylindrical, and an oblique surface 135 extending proximally from surface 136. A spring notch 131 is formed in a medial portion of each arm 130, and an engagement notch 132 is provided adjacent to the proximal end thereof. A pivot protrusion extends radially inwardly from the proximal end of each arm 130. Notch 132 interacts with engagement keys 127 and a release ramps 126. Torque spring 131 is secured about the shaft within the sleeve 123 and adjacent washer 114, and interacts with spring catch 116 and spring notch 131 such that spring 131 is constantly urging engagement keys 127 against retainer arms 130. A pair of retainer springs 137 are provided, each comprising a leaf spring having a V-shaped distal end extending integrally from an L-shaped proximal end. The spring 137 is configured so that proximal leg of the L end is fixed to upper support ring 117 while the V-shaped distal end is received in spring notch 131. Thus the springs 137 impinge on retainer arms 130 so that the arms 130 are constantly urged radially inward and distally.

FIGS. 17-18 illustrate embodiment 400 in the engaged and disengaged positions. In FIG. 17 the assembly is in the engaged/starting position where retainer arms 130 are restrained from moving upward as spring 131 is urging engagement keys 127 to be rotated into notch 132. In FIG. 18 outer sleeve 123 has been rotated to the point where engagement keys 127 are no longer engaged or in contact with notch 132. As a result spring 131 has urged retainer arms 130 into the distally-converging position shown. Note that since springs 131 are urging retainer arms 130 both distally and radially inward, slots 119 will be substantially in contact with surfaces 135/136 during this forward movement. Once the base of the saw bit is in contact with retainer arms 130 and pins 122 are engaged in the base, further downward movement will again align engagement keys 127 with notches 132 allowing spring 131 to return the assembly to the position shown in FIG. 17. Similar to ramped surfaces 90 in embodiment 300, wedge interface 128 is an optional feature that serves to draw retainer arms 130 further downward after engagement of keys 127 with notches 132. The release ramps 126 are another optional feature that addresses the situation where due to fouling or friction between the pilot bit and wooden plug (both not shown), retainer arms 130 may become stuck in the engaged position. In this case the interaction of ramps 126 with notches 132 will raise arms 130 to the point where keys 127 are no longer aligned with notches 132, allowing the user to simply pull off the saw bit.

Figure 19:
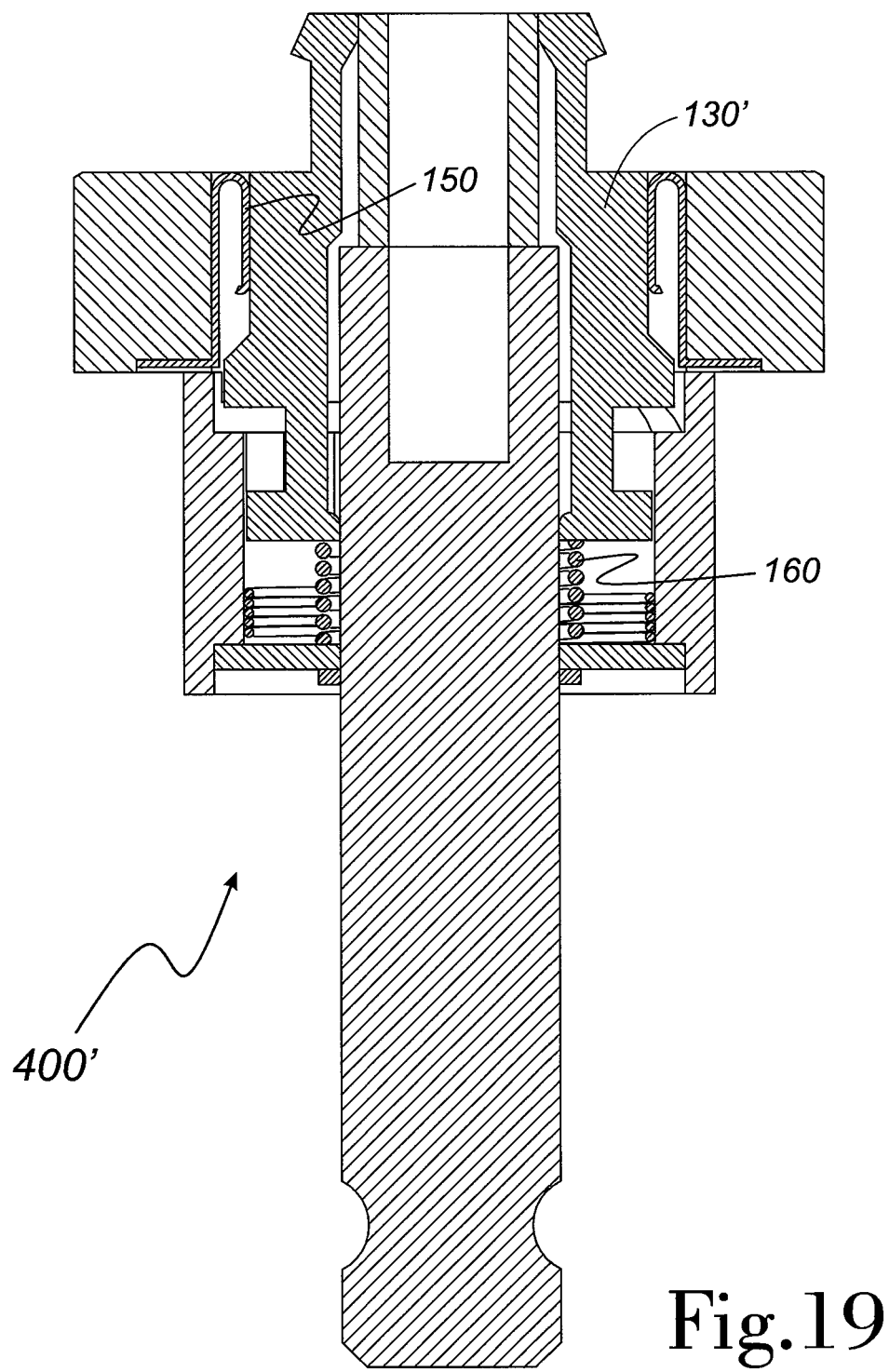
FIG. 19 is a cross-sectional elevation of embodiment 400' of the present invention.

There are many other possible embodiments of the present invention. For example, springs 137 could be replaced as shown in FIG. 19 with a pair of springs 150 that urge the retainer arms 130' radially inward and spring 160 urges retainer arms 130' distally. Another possible embodiment is to reconfigure the retainer arms 130 such that they expanded a hog ring or washer to provide the bit retention means as opposed to the catches illustrated in previous embodiments. Yet another embodiment is to reconfigure embodiment 400 such that engagement keys 127 moved radially inward into notches 132 (similar to embodiment 200) or conversely if notches 132 moved radially outward to engage keys 127. Still yet another embodiment is to integrate a bit retention means with the mandrel's pair of engagement pins as opposed to the center spud. Finally, other embodiments involve the use of ball bearings, expanding washers, pins, etc. . . . as a saw bit retention mechanism. In particular, the use of ball bearings as a means of quick disconnect/connect retention is well known in the art. Also, it should be noted that the disclosed figures are used to illustrate the interoperability of the described elements. In actual production obvious changes would have to be made to allow for both manufacture and assembly.

In all the embodiments of the quick release mandrel described above, a salient aspect is that a single mandrel assembly of the invention may releasably engage a large plurality of rotary bits such as hole saws, without requiring any modification or adapters for the bits themselves. The quick connect/disconnect feature makes the invention convenient and simple to use While the foregoing description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A quick connect/disconnect mechanism for a rotary bit having a central mounting hole at a proximal end thereof, including:

a shaft extending axially and having a proximal end adapted to be releasably secured in a rotary tool;
an upper support ring having an interior bore secured concentrically about a distal end of said shaft, said upper support ring having a pair of diametrically opposed recesses extending in said interior bore;
a pair of retainer arms disposed substantially within said diametrically opposed recesses, each of said retainer arms including a distal end having a catch adapted to engage the central mounting hole of the bit, and a proximal end;
a pair of engagement notches each formed in one of said retainer arms;
an outer sleeve secured about said shaft and adapted for rotational movement thereabout;
a plurality of engagement keys extending radially inwardly from the interior surface of said outer sleeve and disposed to releasably engage said engagement notches;
torque spring means disposed within said outer sleeve and connected between said shaft and said outer sleeve to resiliently bias said outer sleeve to rotate and maintain said engagement keys in said engagement notches;
retainer spring means disposed between said upper support ring and said retainer arms to resiliently urge said retainer arms radially inwardly and distally;
whereby rotation of said outer sleeve against the bias of said torque spring means moves said engagement keys to release said engagement notches and enable said retainer spring means to move said retainer arms radially inwardly and distally to release said catches from the central mounting hole of the rotary bit.

2. The quick connect/disconnect mechanism for a rotary bit of claim 1, further including a pair of pivot protrusions, each extending radially inwardly from one of said retainer arms and impinging on said shaft.

3. The quick connect/disconnect mechanism for a rotary bit of claim 1, wherein each of said engagement keys includes a distal-facing release ramp surface to facilitate release of said engagement keys from said engagement notches.

4. The quick connect/disconnect mechanism for a rotary bit of claim 1, wherein each of said engagement keys includes a proximal-facing cam-like wedge surface to impinge on the respective engagement notch and urge said retainer arm to move proximally.

5. The quick connect/disconnect mechanism for a rotary bit of claim 1, wherein said torque spring means includes a helical torsion spring secured concentrically about said shaft within said outer sleeve and torsionally connected therebetween.

6. The quick connect/disconnect mechanism for a rotary bit of claim 1, wherein said retainer spring means includes a pair of leaf springs, each having a proximal leg secured to said upper support ring and a distal end impinging on one of said retainer arms.

7. The quick connect/disconnect mechanism for a rotary bit of claim 6, wherein said distal end of said leaf spring includes a V-shaped component, and further including a spring notch formed in each of said retainer arms to secure said V-shaped component.

* * * * *